US010955037B2

(12) United States Patent
Watanabe et al.

(10) Patent No.: US 10,955,037 B2
(45) Date of Patent: Mar. 23, 2021

(54) TORQUE CONVERTER

(71) Applicant: YUTAKA GIKEN CO., LTD., Hamamatsu (JP)

(72) Inventors: Kentaro Watanabe, Hamamatsu (JP); Ayako Shibazaki, Hamamatsu (JP); Kazuto Nagaishi, Hamamatsu (JP); Jun Komori, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 0 days.

(21) Appl. No.: 16/488,385

(22) PCT Filed: Feb. 19, 2018

(86) PCT No.: PCT/JP2018/005638
§ 371 (c)(1),
(2) Date: Aug. 23, 2019

(87) PCT Pub. No.: WO2018/155357
PCT Pub. Date: Aug. 30, 2018

(65) Prior Publication Data
US 2020/0248789 A1  Aug. 6, 2020

(30) Foreign Application Priority Data

Feb. 27, 2017 (JP) .............................. JP2017-035156
Feb. 27, 2017 (JP) .............................. JP2017-035157

(51) Int. Cl.
*F16H 45/02* (2006.01)
*F16F 15/123* (2006.01)
*F16F 15/14* (2006.01)

(52) U.S. Cl.
CPC ....... *F16H 45/02* (2013.01); *F16F 15/12353* (2013.01); *F16F 15/145* (2013.01);
(Continued)

(58) Field of Classification Search
CPC ............. F16H 45/02; F16H 2045/0231; F16H 2045/0205; F16H 2045/0236; F16F 15/12353; F16F 15/145; F16F 15/1217
See application file for complete search history.

(56) References Cited

U.S. PATENT DOCUMENTS 9,739,359 B2    8/2017  Okaji et al.
9,791,019 B2   10/2017  Takikawa et al.
(Continued)

FOREIGN PATENT DOCUMENTS

JP    2014-152838 A    8/2014
JP    2015-014363 A    1/2015
(Continued)

OTHER PUBLICATIONS

Office Communication (Notice of Allowance) issued in the corresponding South Korean Patent Application.

*Primary Examiner* — Mark A Manley
(74) *Attorney, Agent, or Firm* — Carrier Blackman & Associates, P.C.; William D. Blackman; Joseph P. Carrier

(57) ABSTRACT

A torque converter includes first and second dampers disposed in a torque transmission path during lockup, and a dynamic damper attached to the torque transmission path between the first and second dampers. The dynamic damper includes an inertial rotating body having a weight member mounted on an outer peripheral part of an inertia plate sandwiched between a pair of retaining plates, and an elastic member provided between the inertia plate and the retaining plates. A claw part is provided on one of the retaining plates disposed on a side opposite to the clutch constituent member with respect to the inertia plate. The first damper spring is sandwiched between the claw part and the clutch constituent member, and an elongated hole is formed in the inertia plate, the elongated hole extending lengthwise in a peripheral (Continued)

direction of the inertia plate while the claw part is inserted through the elongated hole.

10 Claims, 6 Drawing Sheets

(52) U.S. Cl.
CPC .............. *F16H 2045/0231* (2013.01); *F16H 2045/0236* (2013.01)

(56) References Cited

U.S. PATENT DOCUMENTS

| | | |
|---|---|---|
| 10,030,740 B2 | 7/2018 | Tomiyama |
| 2011/0031083 A1* | 2/2011 | Matsuoka ............... F16H 45/02 |
| | | 192/3.29 |
| 2014/0216879 A1* | 8/2014 | Gerdeman ............. F16H 45/02 |
| | | 192/3.28 |
| 2015/0354664 A1* | 12/2015 | Takikawa .......... F16F 15/12366 |
| | | 464/62.1 |

FOREIGN PATENT DOCUMENTS

| | | |
|---|---|---|
| JP | 2015-206452 A | 11/2015 |
| JP | 2016-217471 A | 12/2016 |
| WO | 2015/056733 A1 | 4/2015 |

\* cited by examiner

TORQUE CONVERTER

TECHNICAL FIELD

The present invention relates to a torque converter in which a first damper and a second damper are disposed in a torque transmission path that transmits torque between an output shaft and a clutch constituent member forming part of a lockup clutch so as to rotate together with a pump impeller in a state in which the lockup clutch is connected, the first damper having a first damper spring retained by the clutch constituent member, the second damper having a second damper spring retained by a pair of retaining plates that form part of the torque transmission path and are disposed so as to be spaced in an axial direction of the output shaft, and a dynamic damper being attached to the torque transmission path between the first damper and the second damper.

BACKGROUND ART

A torque converter in which two dampers are disposed in a torque transmission path between an output shaft and a clutch piston of a lockup clutch, and a dynamic damper is attached to the torque transmission path between these dampers is known from Patent Document 1.

PRIOR ART DOCUMENTS

Patent Documents

Patent Document 1: Japanese Patent Application Laid-open No. 2015-14363

SUMMARY OF THE INVENTION

Problems to be Solved by the Invention

The torque converter disclosed in Patent Document 1 above is formed from a damper plate formed by extending in a radially outward direction the outer periphery of one of a pair of retaining plates and a dynamic damper spring housed in a recess formed in each of mutually opposing faces of a pair of inertia rings sandwiching an outer peripheral part of the damper plate from opposite sides, and there is a possibility that it will not be possible to ensure a sufficient inertial mass for the inertia ring, the damping performance of the dynamic damper will be insufficient, the shape of the inertia ring will become complicated, and an increase in the production cost will be incurred. Furthermore, a cylindrical part that is fitted around one of the inertia rings is formed on the damper plate for the purpose of positioning the inertia ring, and in order to ensure the axial length for the fitted part it becomes difficult to reduce the axial dimension of the torque converter in some cases.

The present invention has been accomplished in light of such circumstances, and it is an object thereof to provide a torque converter that enables a dynamic damper to be produced at low cost while ensuring a sufficient inertial mass and that enables a small axial dimension to be realized.

Means for Solving the Problems

In order to attain the above object, according to a first aspect of the present invention, there is provided a torque converter in which a first damper and a second damper are disposed in a torque transmission path that transmits torque between an output shaft and a clutch constituent member forming part of a lockup clutch so as to rotate together with a pump impeller in a state in which the lockup clutch is connected, the first damper having a first damper spring retained by the clutch constituent member, the second damper having a second damper spring retained by a pair of retaining plates that form part of the torque transmission path and are disposed so as to be spaced in an axial direction of the output shaft, and a dynamic damper being attached to the torque transmission path between the first damper and the second damper, characterized in that the dynamic damper comprises an inertial rotating body and an elastic member, the inertial rotating body being formed by mounting a weight member on an outer peripheral part of an inertia plate that is formed into a ring plate shape coaxial with the output shaft and is sandwiched between the pair of retaining plates, and the elastic member being provided between the inertia plate and the pair of retaining plates, a claw part is provided on one retaining plate of the pair of retaining plates that is disposed on a side opposite to the clutch constituent member with respect to the inertia plate, the claw part engaging with the first damper spring so as to sandwich the first damper spring between the claw part and the clutch constituent member, and an elongated hole is formed in the inertia plate, the elongated hole extending lengthwise in a peripheral direction of the inertia plate while having the claw part inserted through the elongated hole.

Further, according to a second aspect of the present invention, in addition to the first aspect, the claw part and an outer peripheral edge of the elongated hole are disposed so as to be close to or abut against each other in a radial direction of the inertia plate in order to carry out in cooperation positioning in the radial direction of the inertia plate with respect to the pair of retaining plates.

According to a third aspect of the present invention, in addition to the first or second aspect, the second damper spring of the second damper is disposed between the pair of retaining plates and a driven plate that is disposed radially inward of the inertia plate so as to rotate together with the output shaft, and the inertia plate and the driven plate are formed from the same material so as to have an identical plate thickness.

According to a fourth aspect of the present invention, in addition to the third aspect, an annular gap between an outer periphery of the driven plate and an inner periphery of the inertia plate is set to be at least 0.8 times the plate thickness of the inertia plate and the driven plate.

Furthermore, according to a fifth aspect of the present invention, in addition to any one of the first to fourth aspects, a length of the elongated hole along the peripheral direction of the inertia plate is set so that the claw part is abutted against an end part, in a longitudinal direction, of the elongated hole in response to a relative rotational angle between the pair of retaining plates and the inertia plate attaining a predetermined value.

According to a sixth aspect of the present invention, in addition to any one of the first to fifth aspects, the pair of retaining plates are relatively non-rotatably linked to each other by linking means at a plurality of locations spaced in the peripheral direction, and a plurality of linking means-housing recesses are formed in an inner peripheral part of the inertia plate so as to open on the inner periphery of the inertia plate, the linking means-housing recesses housing the linking means while allowing relative rotation between the inertia plate and the pair of retaining plates.

According to a seventh aspect of the present invention, in addition to the sixth aspect, a plurality of elastic member-housing recesses are formed in the inner peripheral part of the inertia plate so as to open on the inner periphery of the inertia plate, the elastic member-housing recesses housing respectively a plurality of the elastic members disposed so as to be spaced in the peripheral direction of the inertia plate.

According to an eighth aspect of the present invention, in addition to the seventh aspect, the linking means-housing recess and the elastic member-housing recess are formed into an arc shape so that outer peripheral edges thereof follow a common virtual circle having a center on an axis of the output shaft.

According to a ninth aspect of the present invention, in addition to any one of the sixth to eighth aspects, a stopper portion is formed on opposite end parts of the linking means-housing recess along the peripheral direction of the inertia plate, the stopper portion abutting against the linking means and regulating the limit for relative rotation between the inertia plate and the retaining plate.

According to a tenth aspect of the present invention, in addition to any one of the sixth to ninth aspects, the linking means and the outer peripheral edge of the linking means-housing recess are disposed so as to be close to or abut against each other in the radial direction of the inertia plate in order to carry out in cooperation positioning in the radial direction of the inertia plate with respect to the pair of retaining plates.

Moreover, according to an eleventh aspect of the present invention, in addition to any one of the first to tenth aspects, the first damper is disposed between the clutch constituent member and the pair of retaining plates, and the second damper is disposed between the pair of retaining plates and the driven plate that rotates together with the output shaft.

A clutch piston 43 of an embodiment corresponds to the clutch constituent member of the present invention, a dynamic damper spring 58 of the embodiment corresponds to the elastic member of the present invention, and an first elongated hole 69 of the embodiment corresponds to the elongated hole of the present invention.

Effects of the Invention

In accordance with the first aspect of the present invention, since the inertial rotating body of the dynamic damper is formed by mounting the weight member on the outer peripheral part of the inertia plate sandwiched between the pair of retaining plates, it is possible to ensure a sufficient inertial mass, and production can be carried out at low cost due to the simple shape. Furthermore, since the claw part provided on, among the pair of retaining plates, one retaining plate that is present on the side opposite to the clutch constituent member with respect to the inertia plate is inserted through the elongated hole formed in the inertia plate and is engaged with the first damper spring, it is possible to reduce the length in the axial direction between the clutch constituent member and the one retaining plate, thereby reducing the radial dimension of the torque converter.

In accordance with the second aspect of the present invention, since the position along the radial direction of the inertia plate with respect to the pair of retaining plates is determined by cooperation between the claw part and the outer peripheral edge of the elongated hole, it is possible to determine the relative position along the radial direction of the retaining plate and the inertia plate without incurring any increase in the axial dimension or the number of components.

In accordance with the third aspect of the present invention, since the inertia plate and the driven plate, which is present radially inward of the inertia plate, are formed from the same material so as to have an identical plate thickness, it is possible to make the inertia plate and the driven plate from the same material using one mold, the material yield improves, and the cost can be reduced.

In accordance with the fourth aspect of the present invention, since an annular gap that is at least 0.8 times the plate thickness of the inertia plate and the driven plate is formed between the driven plate and the inertia plate, it becomes possible to employ a general pressing method when making the inertia plate and the driven plate from the same material using one mold. Furthermore, it becomes unnecessary to subject the inner periphery of the driven plate to machining, thus enabling a further reduction in cost to be achieved.

In accordance with the fifth aspect of the present invention, the relative rotational angle between the pair of retaining plates and the inertia plate is prevented from becoming too large, an excessive load is thus prevented from acting on the elastic member disposed between the pair of retaining plates and the inertia plate, and the lifespan of the elastic member can be improved.

In accordance with the sixth aspect of the present invention, since the linking means-housing recess formed in the inner peripheral part of the inertia plate opens on the inner periphery of the inertia plate while housing the linking means, which provides a link between the pair of retaining plates, it is possible to set a small internal diameter for the inertia plate while housing the linking means, thereby reducing the radial dimension of the torque converter.

In accordance with the seventh aspect of the present invention, since the elastic member-housing recess formed in the inner peripheral part of the inertia plate opens on the inner periphery of the inertia plate so as to house the elastic member, it is possible to set a small internal diameter for the inertia plate while housing the elastic member, thereby further reducing the radial dimension of the torque converter.

In accordance with the eighth aspect of the present invention, since the linking means-housing recess and the elastic member-housing recess are formed into an arc shape so that their outer peripheral edges follow the same virtual circle, it is possible to set a smaller internal diameter for the inertia plate while housing both the linking means and the elastic member, thereby further reducing the radial dimension of the torque converter.

In accordance with the ninth aspect of the present invention, since the limit of relative rotation between the inertia plate and the retaining plate is regulated by making the linking means abut against the stopper portion of the linking means-housing recess, it is possible to prevent an excessive load from acting on the elastic member, thereby improving the lifespan of the elastic member.

In accordance with the tenth aspect of the present invention, since positioning along the radial direction of the inertia plate with respect to the retaining plate is carried out by the linking means and the outer peripheral edge of the linking means-housing recess, it is possible to determine the relative positions along the radial direction of the retaining plate and the inertia plate without increasing the number of components.

Furthermore, in accordance with the eleventh aspect of the present invention, since the first damper is disposed between the clutch constituent member and the retaining plate, and the second damper is disposed between the pair of retaining plates and the driven plate, which rotates together with the output shaft, it is possible to improve the damping performance with the two dampers while avoiding any increase in the dimensions of the torque converter. Moreover, since the damper spring of the second damper and the elastic member of the dynamic damper are retained between the pair of retaining plates, it is unnecessary to dispose an elastic member on the inertial rotating body side, and it is possible to simplify the shape of the inertial rotating body and to ensure a sufficient inertial mass for the inertial rotating body, thereby sufficiently enhancing the damping performance of the dynamic damper.

EXPLANATION OF REFERENCE NUMERALS AND SYMBOLS

Figure 1:
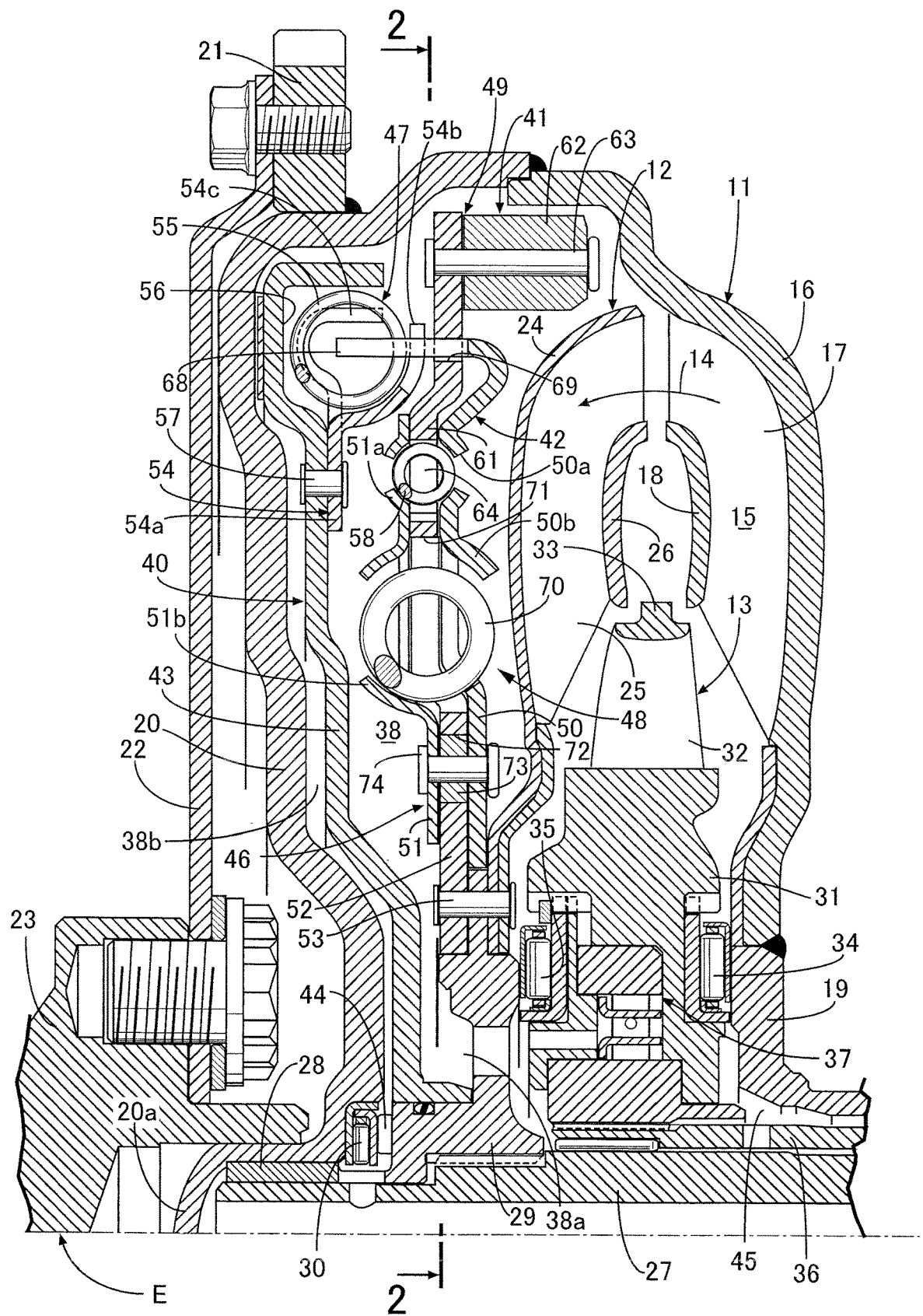
FIG. 1 is a vertical sectional view of a torque converter of a first embodiment and is a sectional view along line 1-1 in FIG. 2. (first embodiment)

11 Pump impeller
27 Output shaft
40 Lockup clutch
41 Inertial rotating body
43 Clutch piston, which is a clutch constituent member
46 Torque transmission path
47 First damper
48 Second damper
49 Dynamic damper
50, 51 Retaining plate
52 Driven plate
55 First damper spring
58 Dynamic damper spring, which is an elastic member
59 Linking means
61 Inertia plate
62 Weight member
64 Elastic member-housing recess
67, 77 Linking means-housing recess
68 Claw part
69 Elongated hole
70 Second damper spring
77a Stopper portion
C Virtual circle
d Annular gap
L Length of elongated hole
t Plate thickness

MODES FOR CARRYING OUT THE INVENTION

Embodiments of the present invention are explained below by reference to the attached drawings.

First Embodiment

A first embodiment of the present invention is explained by reference to FIG. 1 to FIG. 4; first, in FIG. 1, this torque converter includes a pump impeller 11, a turbine runner 12 disposed so as to oppose the pump impeller 11, and a stator 13 disposed between inner peripheral parts of the pump impeller 11 and the turbine runner 12, a circulation circuit 15 through which hydraulic oil circulates being formed as shown by an arrow 14 between the pump impeller 11, the turbine runner 12, and the stator 13.

The pump impeller 11 has a bowl-shaped pump shell 16, a plurality of pump blades 17 provided on an inner face of the pump shell 16, a pump core ring 18 linking the pump blades 17, and a pump hub 19 fixed to an inner peripheral part of the pump shell 16 by for example welding, an oil pump (not illustrated) supplying hydraulic oil to the torque converter being operatively linked to the pump hub 19.

Furthermore, a bowl-shaped transmission cover 20 covering the turbine runner 12 from the outside is joined by welding to an outer peripheral part of the pump shell 16, a ring gear 21 is fixed by welding to an outer peripheral part of the transmission cover 20, and a drive plate 22 is secured to the ring gear 21. Moreover, a crankshaft 23 of a vehicle engine E is coaxially secured to the drive plate 22, and rotational power is inputted from the vehicle engine E into the pump impeller 11.

The turbine runner 12 has a bowl-shaped turbine shell 24, a plurality of turbine blades 25 provided on an inner face of the turbine shell 24, and a turbine core ring 26 linking the turbine blades 25.

An end part of an output shaft 27 transmitting rotational power from the vehicle engine E to a transmission, which is not illustrated, is supported, via a bearing bush 28, on a bottomed cylindrical support tube portion 20a integrally provided on a center part of the transmission cover 20. The output shaft 27 is spline joined to an output hub 29 disposed at a position spaced in the axial direction from the pump hub 19, and a needle thrust bearing 30 is disposed between the output hub 29 and the transmission cover 20.

The stator 13 has a stator hub 31 disposed between the pump hub 19 and the output hub 29, a plurality of stator blades 32 provided on the outer periphery of the stator hub 31, and a stator core ring 33 linking the outer periphery of the stator blades 32, a thrust bearing 34 is disposed between the pump hub 19 and the stator hub 31, and a thrust bearing 35 is disposed between the output hub 29 and the stator hub 31.

A one-way clutch 37 is disposed between the stator hub 31 and a stator shaft 36 relatively rotatably surrounding the output shaft 27, which rotates together with the output hub 29, and the stator shaft 36 is non-rotatably supported on a transmission case (not illustrated).

A clutch chamber 38 communicating with the circulation circuit 15 is formed between the transmission cover 20 and the turbine shell 24. Housed within the clutch chamber 38 are a lockup clutch 40, an inertial rotating body 41, and a spring holder 42 sandwiching an inner peripheral part of the inertial rotating body 41 from opposite sides while enabling relative rotation with respect to the inertial rotating body 41 over a restricted range.

The lockup clutch 40 has a clutch piston 43 that can be frictionally connected to the transmission cover 20 and can switch between a connected state in which the clutch piston 43 is frictionally connected to the transmission cover 20 and a non-connected state in which the frictional connection is released, and an inner peripheral part of the clutch piston 43 formed into a disk shape is slidably supported on the output hub 29 so that it can move in the axial direction.

The interior of the clutch chamber 38 is divided by the clutch piston 43 into an inside chamber 38a on the turbine runner 12 side and an outside chamber 38b on the transmission cover 20 side, an oil groove 44 formed in the output hub 29 so as to be adjacent to the needle thrust bearing 30 communicates with the outside chamber 38b, and the oil groove 44 communicates with the interior of the cylindrical output shaft 27. Furthermore, an oil passage 45 communicating with an inner peripheral part of the circulation circuit 15 is formed between the pump hub 19 and the stator shaft 36. The oil pump and an oil reservoir (not illustrated) are alternately connected to the oil groove 44 and the oil passage 45.

When the vehicle engine E is idling or in a very low speed operating range, hydraulic oil is supplied from the oil groove 44 to the outside chamber 38b, and hydraulic oil is guided out from the oil passage 45; in this state the outside chamber 38b has a higher pressure than that of the inside chamber 38a, the clutch piston 43 is pushed toward the side on which it moves away from an inner face of the transmission cover 20, and the lockup clutch 40 attains a non-connected state. In this state, relative rotation between the pump impeller 11 and the turbine runner 12 is allowed, the pump impeller 11 is rotated by the vehicle engine E, hydraulic oil within the circulation circuit 15 thereby circulates within the circulation circuit 15 as shown by the arrow 14 in sequence from the pump impeller 11 to the turbine runner 12 and then to the stator 13, and the rotational torque of the pump impeller 11 is transmitted to the output shaft 27 via the turbine runner 12, the spring holder 42 and the output hub 29.

In a state in which there is a torque amplification action between the pump impeller 11 and the turbine runner 12 the accompanying reaction force is borne by the stator 13, and the stator 13 is fixed by the locking function of the one-way clutch 37. Furthermore, when the torque amplification action is completed, the stator 13 rotates together with the pump impeller 11 and the turbine runner 12 in the same direction while making the one-way clutch 37 idle due to the direction of the torque that the stator 13 receives being reversed.

When such a torque converter attains a coupled state or a nearly coupled state, the connected states between the oil groove 44 and oil passage 45 and the oil pump and oil reservoir are switched over so that hydraulic oil is supplied from the oil passage 45 to the inside chamber 38a and hydraulic oil is guided out from the oil groove 44. As a result, the inside chamber 38a of the clutch chamber 38 has a higher pressure than that of the outside chamber 38b, the difference in pressure pushes the clutch piston 43 toward the transmission cover 20 side, an outer peripheral part of the clutch piston 43 is pressed against the inner face of the transmission cover 20 and is frictionally connected to the transmission cover 20, and the lockup clutch 40 attains a connected state.

When the lockup clutch 40 has attained the connected state, the torque transmitted from the vehicle engine E to the transmission cover 20 is mechanically transmitted to the output shaft 27 via a torque transmission path 46, which includes the clutch piston 43 as a clutch constituent member rotating together with the pump impeller 11 while forming part of the lockup clutch 40, the spring holder 42, and the output hub 29. Disposed in the torque transmission path 46 are a first damper 47 having a first damper spring 55 retained by the clutch piston 43 and a second damper 48 having a second damper spring 70 retained by the spring holder 42 forming part of the torque transmission path 46. A dynamic damper 49 is attached to the torque transmission path 46 between the first damper 47 and the second damper 48.

The spring holder 42 is formed by linking relatively non-rotatably to each other a pair of retaining plates 50 and 51 that are disposed across a gap in the axial direction of the output shaft 27 and disposed coaxially with the output hub 29. An inner peripheral part of a ring plate-shaped driven plate 52, which is sandwiched between a pair of the retaining plates 50 and 51, which has part protruding in the radially inward direction from the retaining plates 50 and 51, and which forms part of the torque transmission path 46, and an inner peripheral part of the turbine shell 24 in the turbine runner 12 are fixed to the output hub 29 by means of a plurality of first rivets 53 so as to rotate together with the output hub 29.

The first damper 47 is formed by disposing between the clutch piston 43 and the spring holder 42 a plurality of the first damper springs 55, which have a coil shape, are retained by the clutch piston 43, and are disposed at equal intervals in the peripheral direction.

An annular housing recess part 56 is formed in a face, on the side opposite to the transmission cover 20, of an outer peripheral part of the clutch piston 43, and a spring retaining member 54 retaining the first damper springs 55, which are housed within the housing recess part 56 at equal intervals in the peripheral direction, between itself and the clutch piston 43 is fixed to the clutch piston 43.

The spring retaining member 54 is formed so as to integrally have a ring plate portion 54a disposed coaxially with the clutch piston 43 while having an outer periphery substantially corresponding to the inner periphery of the housing recess part 56, a spring cover portion 54b formed into an arc-shaped cross section covering the inside of the first damper spring 55 along the radial direction of the clutch piston 43, connected to four positions, equally spaced in the peripheral direction, of the outer periphery of the ring plate portion 54a, and formed lengthwise along the peripheral direction of the clutch piston 43, and a spring abutment portion 54c disposed between the spring cover portions 54b and connected to the outer periphery of the ring plate portion 54a so as to project further outward in the radial direction than the spring cover portion 54b, the ring plate portion 54a being fixed to the clutch piston 43 by means of a plurality of second rivets 57.

The spring abutment portion 54c is disposed between a plurality of the first damper springs 55, and when the lockup clutch 40 is in a non-connected state, the spring abutment portions 54c abut against an end part of the first damper springs 55 on opposite sides.

Figure 2:
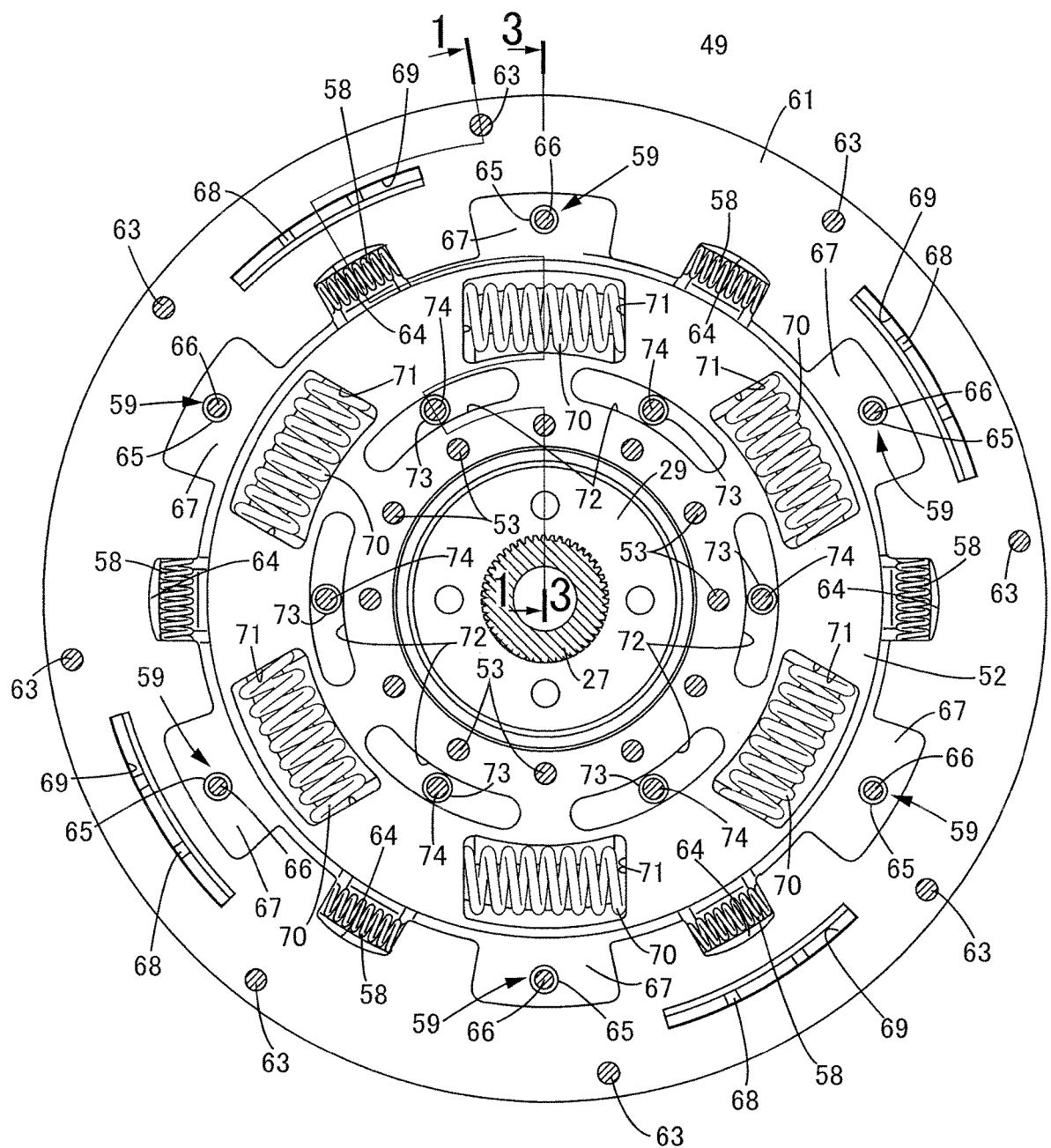
FIG. 2 is a sectional view along line 2-2 in FIG. 1. (first embodiment)
Figure 3:
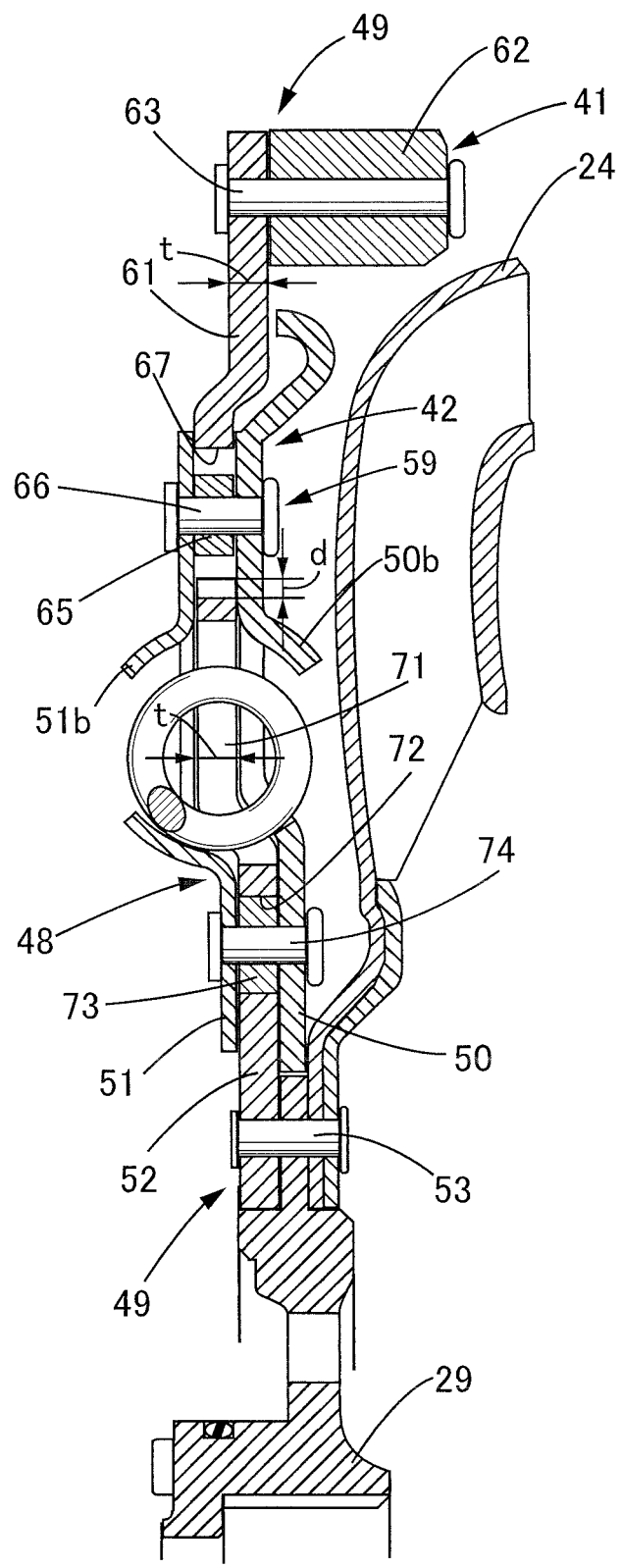
FIG. 3 is a sectional view along line 3-3 in FIG. 2. (first embodiment)

Referring in addition to FIG. 2 and FIG. 3, the dynamic damper 49 includes the spring holder 42, the inertial rotating body 41, and a plurality of, for example six, coil-shaped dynamic damper springs 58 as an elastic member disposed between the spring holder 42 and the inertial rotating body 41.

The inertial rotating body 41 is formed from a ring plate-shaped inertia plate 61 sandwiched between outer peripheral parts of the pair of retaining plates 50 and 51, and a ring-shaped weight member 62 fixed to the inertia plate 61 by means of a plurality of third rivets 63. The inertia plate 61 is formed so that its outer peripheral part projects further in the radially outward direction than the pair of retaining plates 50 and 51, and the weight member 62 is fixed to an outer peripheral part of the inertia plate 61. Furthermore, the dynamic damper spring 58 is retained by the pair of retaining plates 50 and 51 and is disposed between the pair of retaining plates 50 and 51 and the inertia plate 61, which forms part of the inertial rotating body 41.

Spring-retaining portions 50a and 51a for retaining the dynamic damper spring 58 are formed at a plurality of, for example six, locations equally spaced in the peripheral direction of the pair of retaining plates 50 and 51, part of the dynamic damper spring 58 facing the exterior. On the other hand, an elastic member-housing recess 64 housing the dynamic damper spring 58 is formed in an inner peripheral portion, corresponding to the spring-retaining portions 54*a* and 55*a*, of the inertia plate 61 so that the elastic member-housing recess 64 opens on an inner peripheral part of the inertia plate 61. When the lockup clutch 40 is in a non-connected state, opposite end parts, along the peripheral direction of the inertia plate 61, of the elastic member-housing recess 64 abut against opposite end parts of the dynamic damper spring 58.

The pair of retaining plates 50 and 51 forming the spring holder 42 are relatively non-rotatably linked by a plurality of, for example six, linking means 59 spaced in the peripheral direction. The linking means 59 is formed from a cylindrical first spacer 65 disposed between the retaining plates 50 and 51, and a fourth rivet 66 extending through the first spacer 65 so as to relatively non-rotatably link the pair of retaining plates 50 and 51. A plurality of linking means-housing recesses 67 are formed in an inner peripheral part of the inertia plate 61 so as to be disposed between the elastic member-housing recesses 64 in the peripheral direction of the inertia plate 61 and open on the inner periphery of the inertia plate 61, the linking means-housing recess 67 housing the linking means 59 while allowing relative rotation between the inertia plate 61 and the pair of retaining plates 50 and 51.

The inertia plate 61 and the driven plate 52, which is disposed radially inward of the inertia plate 61, are formed from identical materials, for example identical steel plates, so as to have an identical plate thickness t, and an annular gap d between the outer periphery of the driven plate 52 and the inner periphery of the inertia plate 61 is set to be at least 0.8 times the plate thickness t of the inertia plate 61 and the driven plate 52.

The first damper spring 55 of the first damper 47 is disposed between the spring abutment portion 54*c* of the spring retaining member 54 fixed to the clutch piston 43 and one of the pair of retaining plates 50 and 51 forming the spring holder 42, in this embodiment the retaining plate 50, which is on the side opposite to the clutch piston 43 of the lockup clutch 40. A plurality of claw parts 68 are provided integrally with the retaining plate 50 so as to sandwich the first damper spring 55 between themselves and the spring abutment portion 53*c* of the spring retaining member 54.

Figure 4:
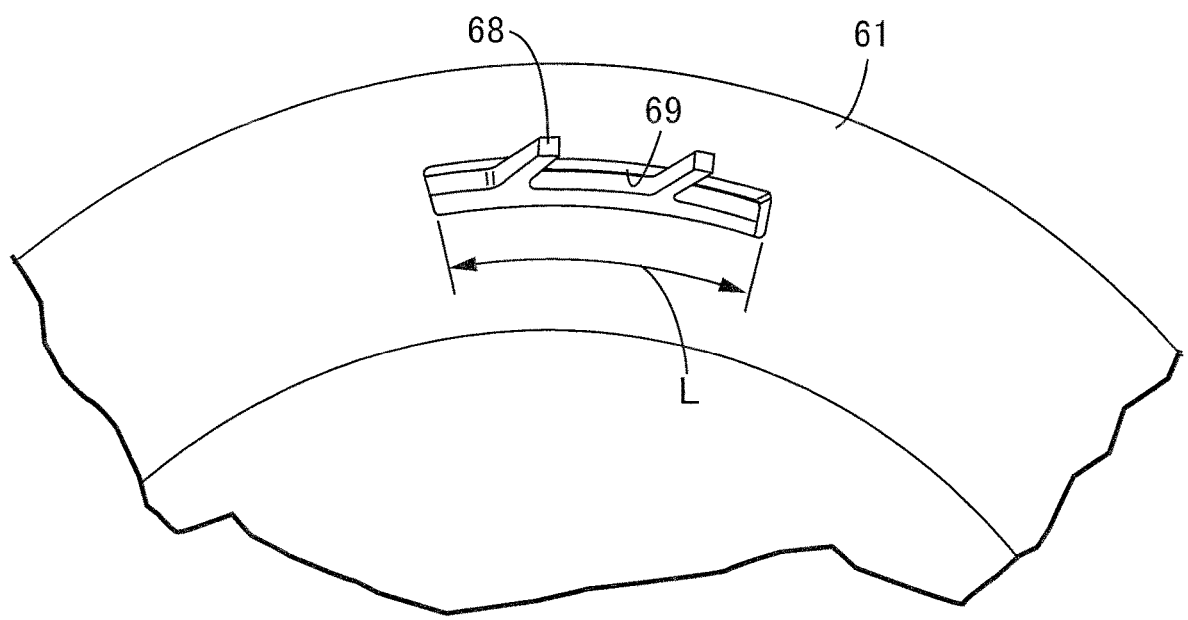
FIG. 4 is a perspective view showing a claw part that is inserted through an elongated hole of an inertia plate. (first embodiment)

Referring in addition to FIG. 4, a first elongated hole 69 is formed in the inertia plate 61, the first elongated hole 69 extending lengthwise in the peripheral direction of the inertia plate 61 while having inserted therethrough the claw part 68, which is formed into a bifurcate shape. In this embodiment, an outer peripheral part of the retaining plate 50 is bent and formed so as to protrude toward the side opposite to the first damper spring 55, and the same number of claw parts 68 as there are first damper springs 55 are provided integrally with the retaining plate 50 so as to extend in a direction along the axis of the output shaft 27 from the bent part on the outer periphery of the retaining plate 50.

Moreover, the claw part 68 and the outer peripheral edge of the first elongated hole 69 are disposed so as to be close to or abut against each other in the radial direction of the inertia plate 61 in order to carry out in cooperation positioning, along the radial direction, of the inertia plate 61 with respect to the pair of retaining plates 50 and 51.

A length L of the first elongated hole 69 in the peripheral direction of the inertia plate 61 is set so that the claw part 68 is made to abut against an end part in the longitudinal direction of the first elongated hole 69 in response to a relative rotational angle between the pair of retaining plates 50 and 51 and the inertia plate 61 attaining a predetermined value.

The second damper 48 is disposed between the pair of retaining plates 50 and 51 and the driven plate 52, which rotate together with the output shaft 27, and a plurality, for example six, of the second damper springs 70 that form part of the second damper 48 are retained between the pair of retaining plates 50 and 51.

Spring-retaining portions 50*b* and 51*b* for retaining the second damper spring 70 are formed at a plurality of, for example six, locations equally spaced in the peripheral direction of the pair of retaining plates 50 and 51 so that part of the second damper spring 70 faces the exterior. On the other hand, a spring housing hole 71 housing the second damper spring 70 is formed in an inner peripheral part, corresponding to the spring-retaining portions 50*b* and 51*b*, of the driven plate 52.

A cylindrical second spacer 73 is disposed between the pair of retaining plates 50 and 51 on the inner side of the spring housing hole 71 along the radial direction of the pair of retaining plates 50 and 51, the cylindrical second spacer 73 being inserted through a respective second elongated hole 72 that is provided at a plurality of, for example six, locations equally spaced in the peripheral direction of the driven plate 52 and extending lengthwise in the peripheral direction. The pair of retaining plates 50 and 51 are linked by a plurality of fifth rivets 74 each extending through the second spacer 73. That is, the driven plate 52 can rotate relative to the spring holder 42 over a restricted range through which the second spacer 73 moves within the second elongated hole 72.

The operation of the first embodiment is now explained. Since the dynamic damper 49, which is attached to the torque transmission path 46 between the output shaft 27 and the clutch piston 43 forming part of the lockup clutch 40, includes the inertial rotating body 41, which is formed by mounting the weight member 62 on the outer peripheral part of the inertia plate 61 formed into a ring plate shape coaxial with the output shaft 27 and sandwiched between the pair of retaining plates 50 and 51, and the dynamic damper spring 58, which is provided between the inertia plate 61 and the pair of retaining plates 50 and 51, it is possible to ensure a sufficient inertial mass with the inertial rotating body 41, thus enabling production at low cost due to the shape being simple.

Furthermore, since the claw part 68 engaging with the first damper spring 55 so as to sandwich the first damper spring 55 between itself and the clutch piston 43 is provided on one retaining plate 50 of the pair of retaining plates 50 and 51 that is disposed on the side opposite to the clutch piston 43 with respect to the inertia plate 61, and the first elongated hole 69 extending lengthwise in the peripheral direction of the inertia plate 61 while having the claw part 68 extending therethrough is formed in the inertia plate 61, it becomes possible to shorten the distance between the clutch piston 43 and the one retaining plate 50 in the axial direction, thereby enabling the axial dimension of the torque converter to be reduced.

Since the claw part 68 and the outer peripheral edge of the first elongated hole 69 are disposed so as to be close to or abut against each other in the radial direction of the inertia plate 61 in order to carry out in cooperation positioning along the radial direction of the inertia plate 61 with respect to the pair of retaining plates 50 and 51, it is possible to determine the relative positions along the radial direction of the retaining plates 50 and 51 and the inertia plate 61 without incurring any increase in the axial dimension or the number of components.

Furthermore, since the second damper spring 70 of the second damper 48 is disposed between the pair of retaining plates 50 and 51 and the driven plate 52, which is disposed radially inward of the inertia plate 61 so as to rotate together with the output shaft 27, and the inertia plate 61 and the driven plate 52 are formed from the same material so as to have the identical plate thickness t, it is possible to make the inertia plate 61 and the driven plate 52 from the same material using one mold, the material yield improves, and the cost can be reduced.

Since the annular gap d between the outer periphery of the driven plate 52 and the inner periphery of the inertia plate 61 is set to be at least 0.8 times the plate thickness t of the inertia plate 61 and the driven plate 52, it becomes possible to employ a general pressing method when making the inertia plate 61 and the driven plate 52 from the same material using one mold. It becomes unnecessary to subject the inner periphery of the driven plate 52 to machining, thus enabling a further reduction in cost to be achieved.

Moreover, since the length L of the first elongated hole 69 along the peripheral direction of the inertia plate 61 is set so that the claw part 68 is abutted against the end part in the longitudinal direction of the first elongated hole 69 in response to the relative rotational angle between the pair of retaining plates 50 and 51 and the inertia plate 61 attaining a predetermined value, it is possible to prevent the relative rotational angle between the pair of retaining plates 50 and 51 and the inertia plate 61 from becoming too large, thereby preventing an excessive load from acting on the dynamic damper spring 58 disposed between the pair of retaining plates 50 and 51 and the inertia plate 61 and enabling a long lifespan to be achieved for the dynamic damper spring 58.

Moreover, since the second damper spring 70 forming part of the second damper 48 is retained between the pair of retaining plates 50 and 51, the second damper spring 70 of the second damper 48 and the dynamic damper spring 58 of the dynamic damper 49 are retained between the pair of retaining plates 50 and 51, and it thus becomes unnecessary to dispose the dynamic damper spring 58 on the inertial rotating body 41 side, thus enabling the shape of the inertial rotating body 41 to be simplified and ensuring a sufficient inertial mass for the inertial rotating body 41 and thereby sufficiently enhancing the damping performance of the dynamic damper 49.

Second Embodiment

A second embodiment of the present invention is explained by reference to FIG. 5 and FIG. 6; parts corresponding to those of the first embodiment above are denoted by the same reference numerals and symbols and only illustrated, detailed explanation thereof being omitted.

The pair of retaining plates 50 and 51 are relatively non-rotatably linked to each other by the plurality of linking means 59, and a plurality of linking means-housing recesses 77 housing the linking means 59 while allowing relative rotation of the inertia plate 61 and the pair of retaining plates 50 and 51 are formed in the inner peripheral part of the inertia plate 61 so as to open on the inner periphery of the inertia plate 61. Furthermore, the elastic member-housing recess 64 housing the dynamic damper spring 58 is formed in the inner peripheral part of the inertia plate 61 at a position, corresponding to the spring-retaining portions 50a and 51a, of the inertia plate 61 so as to open on the inner periphery of the inertia plate 61, and the linking means-housing recess 77 is disposed between the elastic member-housing recesses 64 in the peripheral direction of the inertia plate 61.

Figure 5:
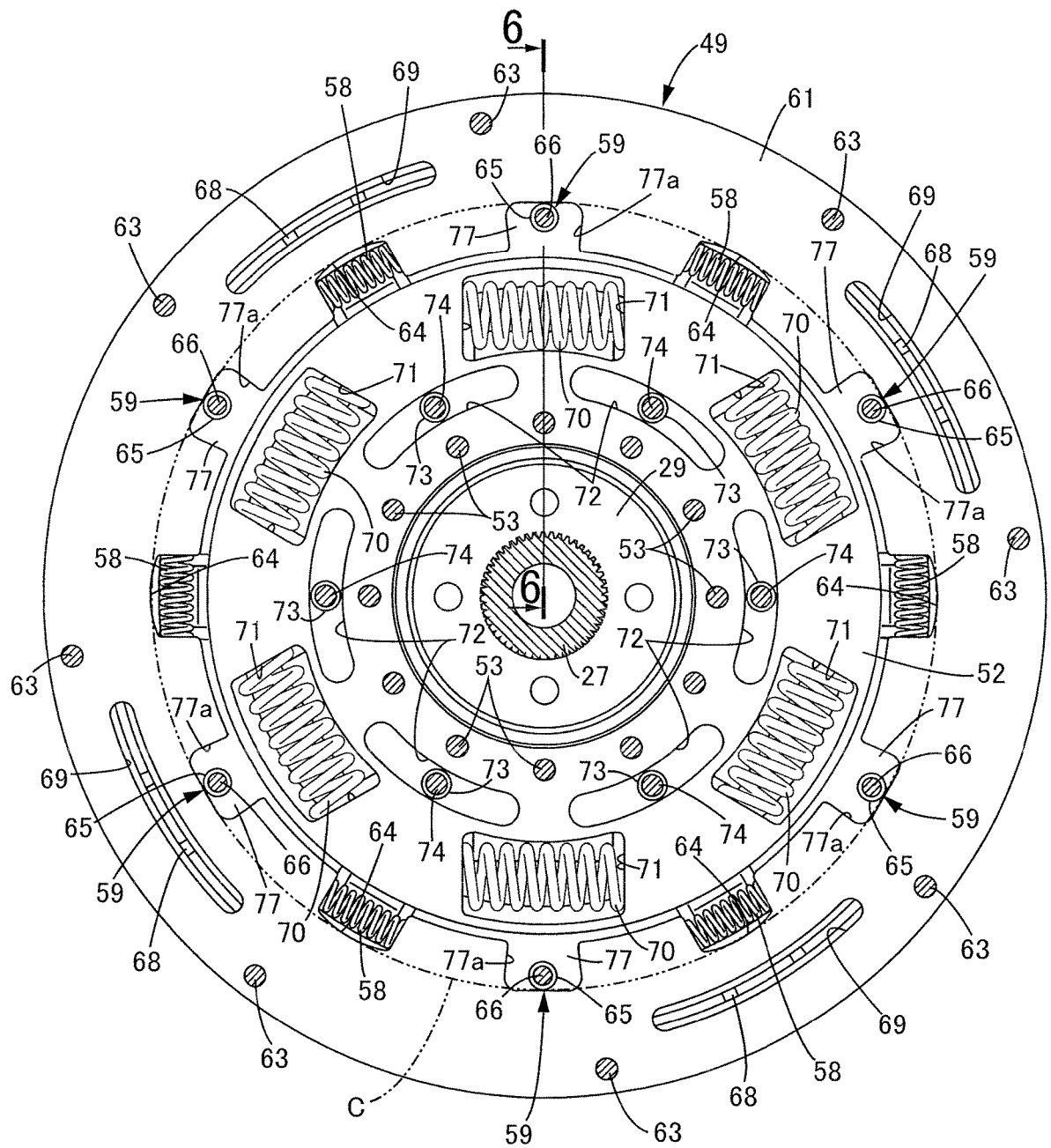
FIG. 5 is a sectional view, corresponding to FIG. 2, of a second embodiment. (second embodiment)
Figure 6:
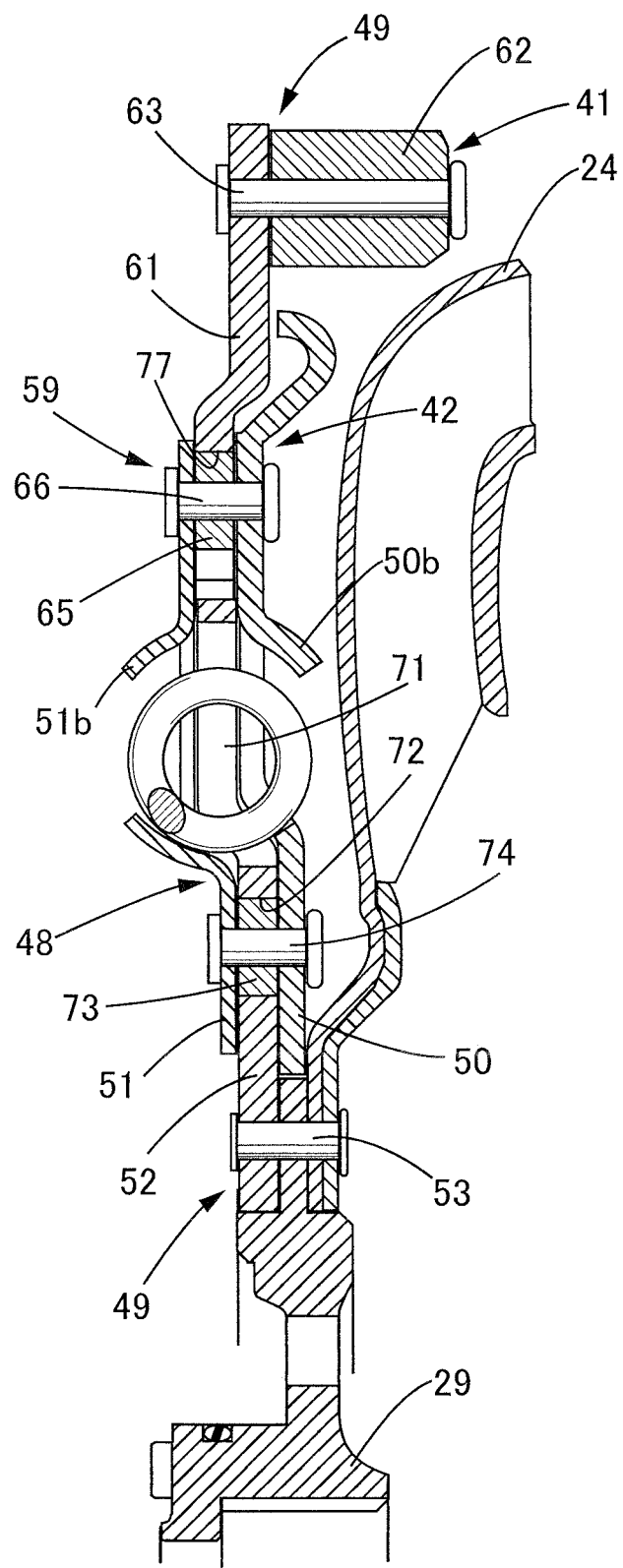
FIG. 6 is a sectional view along line 6-6 in FIG. 5. (second embodiment)

Moreover, as shown in FIG. 5 the linking means-housing recess 67 and the elastic member-housing recess 64 are formed into an arc shape so that the outer peripheral edges thereof follow the same virtual circle C having its center on the axis of the output shaft 27.

Furthermore, a stopper portion 77a is formed on opposite end parts of the linking means-housing recess 77 along the peripheral direction of the inertia plate 61, the stopper portion 77a abutting against the spacer 65 of the linking means 59 to thus regulate the limit of relative rotation between the inertia plate 61 and the pair of retaining plates 50 and 51.

Moreover, the linking means 59 and the outer peripheral edge of the linking means-housing recess 67 are disposed so as to be close to or abut against each other in the radial direction of the inertia plate 61 in order to carry out positioning in the radial direction of the inertia plate 61 with respect to the pair of retaining plates 50 and 51.

In accordance with the second embodiment, since the pair of retaining plates 50 and 51 are relatively non-rotatably linked to each other by the linking means 59 at a plurality of locations spaced in the peripheral direction, and the plurality of linking means-housing recesses 77 housing the linking means 59 while allowing relative rotation between the pair of retaining plates 50 and 51 and the inertia plate 61, which is sandwiched between the pair of retaining plates 50 and 51, are formed in the inner peripheral part of the inertia plate 61 so as to open on the inner periphery of the inertia plate 61, it is possible to set a smaller internal diameter for the inertia plate 61 while housing the linking means 59, thereby reducing the radial dimension of the torque converter.

Furthermore, since the plurality of elastic member-housing recesses 64 housing respectively the plurality of the dynamic damper springs 58 disposed so as to be spaced in the peripheral direction of the inertia plate 61 are formed in the inner peripheral part of the inertia plate 61 so as to open on the inner periphery of the inertia plate 61, it is possible to set a smaller internal diameter for the inertia plate 61 while housing the dynamic damper springs 58, thereby further reducing the radial dimension of the torque converter.

Moreover, since the linking means-housing recess 77 and the elastic member-housing recess 64 are formed into an arc shape so that the outer peripheral edges thereof follow the same virtual circle C having its center on the axis of the output shaft 27, it is possible to set a smaller internal diameter for the inertia plate 61 while housing both the linking means 59 and the dynamic damper spring 58, thereby further reducing the radial dimension of the torque converter.

Furthermore, since the stopper portion 77a is formed on opposite end parts of the linking means-housing recess 77 along the peripheral direction of the inertia plate 61, the stopper portion 77a abutting against the linking means 59 to thus regulate the limit of relative rotation between the inertia plate 61 and the pair of retaining plates 50 and 51, and the limit of relative rotation between the inertia plate 61 and the pair of retaining plates 50 and 51 is restricted by abutting the linking means 59 against the stopper portion 77a of the linking means-housing recess 77, it is possible to prevent an excessive load from acting on the dynamic damper spring 58, thus increasing the lifespan of the dynamic damper spring 58.

Moreover, since the linking means 59 and the outer peripheral edge of the linking means-housing recess 77 are disposed so as to be close to or abut against each other in the radial direction of the inertia plate 61 in order to carry out in cooperation positioning in the radial direction of the inertia plate 61 with respect to the pair of retaining plates 50 and 51, it is possible to determine the relative positions along the radial direction of the pair of retaining plates 50 and 51 and the inertia plate 61 without increasing the number of components.

Furthermore, since the first damper 47, which has the first damper spring 55 retained by the clutch piston 43, is disposed between the clutch constituent member 43 and the pair of retaining plates 50 and 51, and the second damper 48 is disposed between the pair of retaining plates 50 and 51 and the driven plate 52, which rotates together with the output shaft 27, it is possible to improve the damping performance of the two dampers 47 and 48 while avoiding any increase in the dimensions of the torque converter.

Moreover, since the claw part 68 engaging with the first damper spring 55 is provided on one retaining plate 50 of the pair of retaining plates 50 and 51, and the elongated hole 72 extending lengthwise in the peripheral direction of the inertia plate 61 while having the claw part 68 extending therethrough is formed in the inertia plate 61, it becomes possible to shorten the distance between the clutch piston 43 and the pair of retaining plates 50 and 51 in the axial direction, thereby enabling the axial dimension of the torque converter to be reduced.

Embodiments of the present invention are explained above, but the present invention is not limited to the above embodiments and may be modified in a variety of ways as long as the modifications do not depart from the spirit and scope thereof.

The invention claimed is:

1. A torque converter in which a first damper and a second damper are disposed in a torque transmission path that transmits torque between an output shaft and a clutch constituent member forming part of a lockup clutch so as to rotate together with a pump impeller in a state in which the lockup clutch is connected, the first damper having a first damper spring retained by the clutch constituent member, the second damper having a second damper spring retained by a pair of retaining plates that form part of the torque transmission path and are disposed so as to be spaced in an axial direction of the output shaft, and a dynamic damper being attached to the torque transmission path between the first damper and the second damper, wherein the dynamic damper comprises an inertial rotating body and an elastic member, the inertial rotating body being formed by mounting a weight member on an outer peripheral part of an inertia plate that is formed into a ring plate shape coaxial with the output shaft and is sandwiched between the pair of retaining plates, and the elastic member being provided between the inertia plate and the pair of retaining plates, a claw part is provided on one of the pair of retaining plates that is disposed on a side opposite to the clutch constituent member with respect to the inertia plate, the claw part engaging with the first damper spring so as to sandwich the first damper spring between the claw part and the clutch constituent member, and an elongated hole is formed in the inertia plate, the elongated hole extending lengthwise in a peripheral direction of the inertia plate while having the claw part inserted through the elongated hole, wherein the second damper spring of the second damper is disposed between the pair of retaining plates and a driven plate that is disposed radially inward of the inertia plate so as to rotate together with the output shaft, and the inertia plate and the driven plate are formed from the same material so as to have an identical plate thickness.

2. The torque converter according to claim 1, wherein the claw part and an outer peripheral edge of the elongated hole are disposed so as to be close to or abut against each other in a radial direction of the inertia plate in order to carry out in cooperation positioning in the radial direction of the inertia plate with respect to the pair of retaining plates.

3. The torque converter according to claim 1, wherein an annular gap, between an outer periphery of the driven plate and an inner periphery of the inertia plate, is set to be at least 0.8 times the plate thickness of the inertia plate and the driven plate.

4. The torque converter according to claim 1, wherein a length of the elongated hole along the peripheral direction of the inertia plate is set so that the claw part is abutted against an end part, in a longitudinal direction, of the elongated hole in response to a relative rotational angle between the pair of retaining plates and the inertia plate attaining a predetermined value.

5. The torque converter according to claim 1, wherein the pair of retaining plates are relatively non-rotatably linked to each other by links at a plurality of locations spaced in the peripheral direction, and a plurality of link-housing recesses are formed in an inner peripheral part of the inertia plate so as to open on the inner periphery of the inertia plate, the link-housing recesses housing the links while allowing relative rotation between the inertia plate and the pair of retaining plates.

6. The torque converter according to claim 5, wherein a plurality of elastic member-housing recesses are formed in the inner peripheral part of the inertia plate so as to open on the inner periphery of the inertia plate, the elastic member-housing recesses housing respectively a plurality of the elastic members disposed so as to be spaced in the peripheral direction of the inertia plate.

7. The torque converter according to claim 6, wherein the link-housing recesses and the elastic member-housing recesses are formed into an arc shape so that outer peripheral edges thereof follow a common virtual circle having a center on an axis of the output shaft.

8. The torque converter according to claim 5, wherein stopper portions are respectively provided on opposite end parts of each of the link-housing recesses along the peripheral direction of the inertia plate, the stopper portions abutting against the links and regulating the limit for relative rotation between the inertia plate and the retaining plate.

9. The torque converter according to claim 5, wherein the links and the outer peripheral edge of the link-housing recesses are disposed so as to be close to or abut against each other in the radial direction of the inertia plate in order to carry out in cooperation positioning in the radial direction of the inertia plate with respect to the pair of retaining plates.

10. The torque converter according to claim 1, wherein the first damper is disposed between the clutch constituent member and the pair of retaining plates, and the second damper is disposed between the pair of retaining plates and a driven plate that rotates together with the output shaft.

* * * * *